Inventors
Frederick W. Sturm
Byron J. Pepper

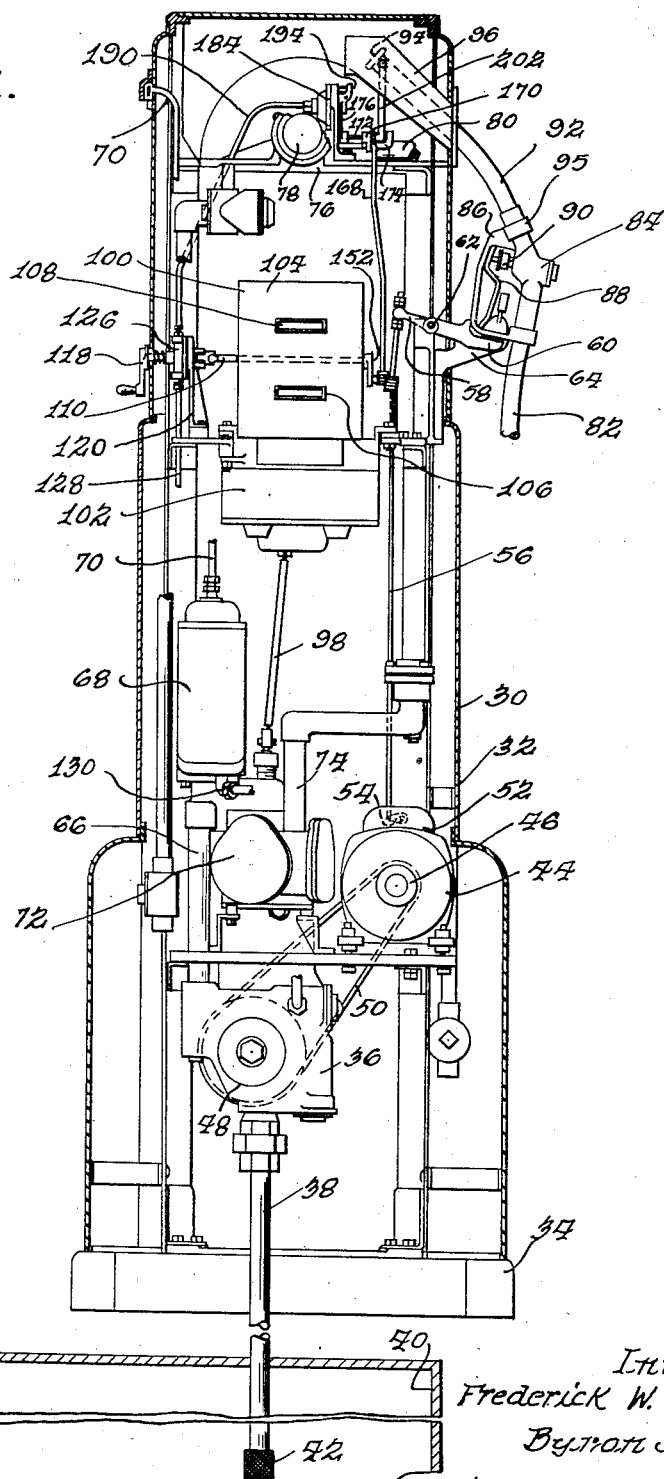

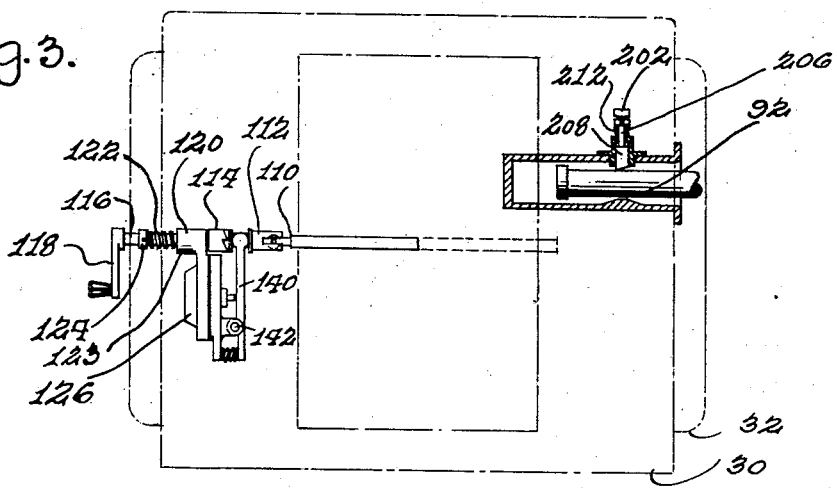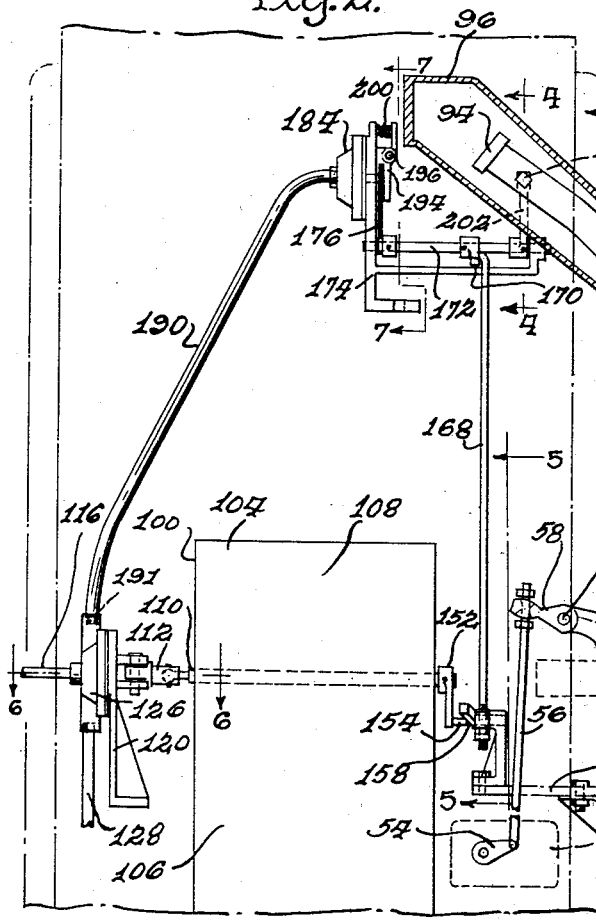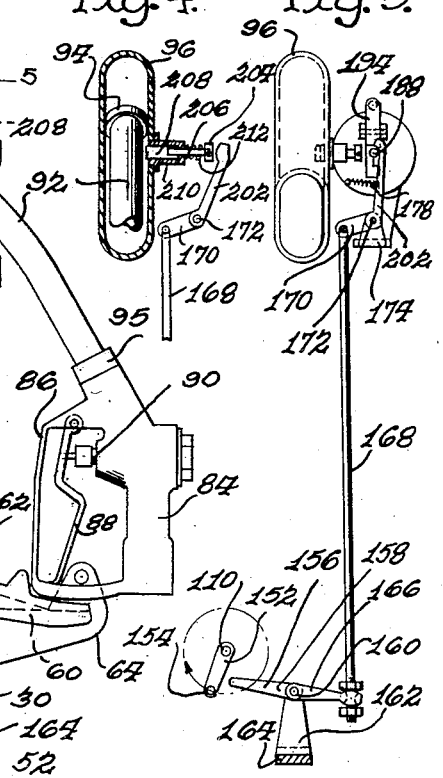

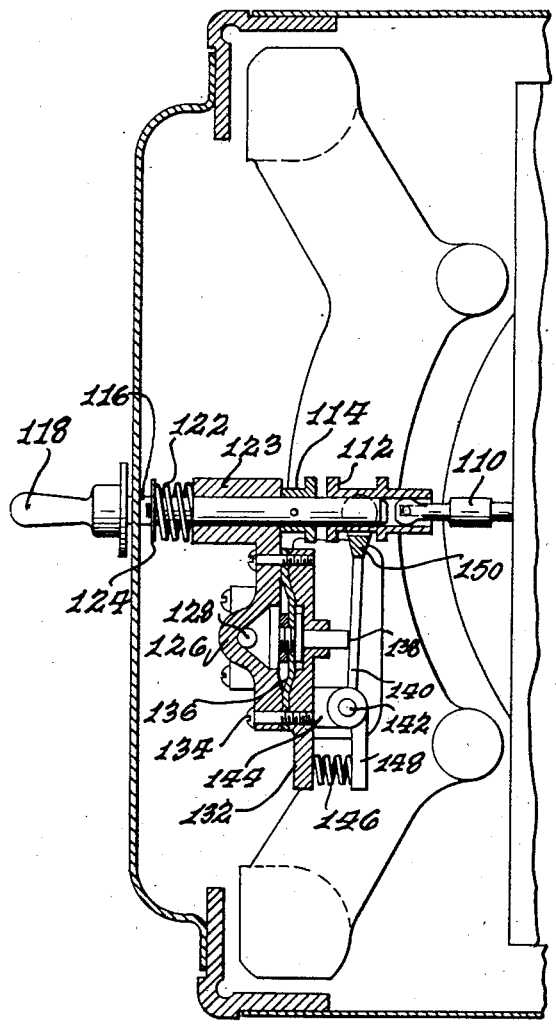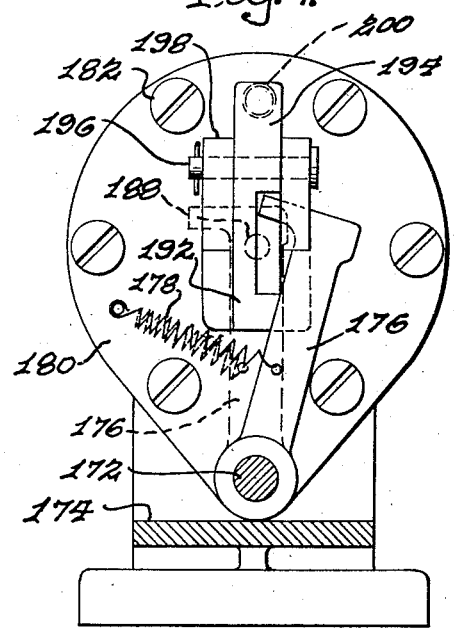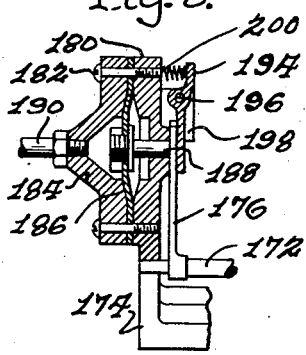

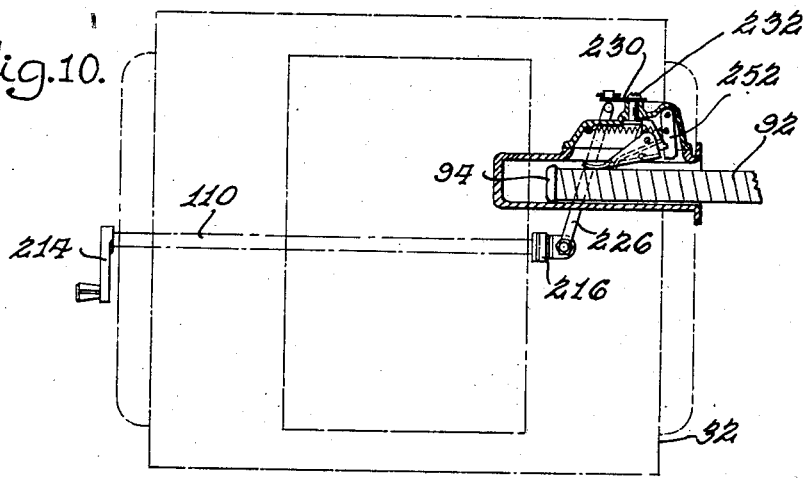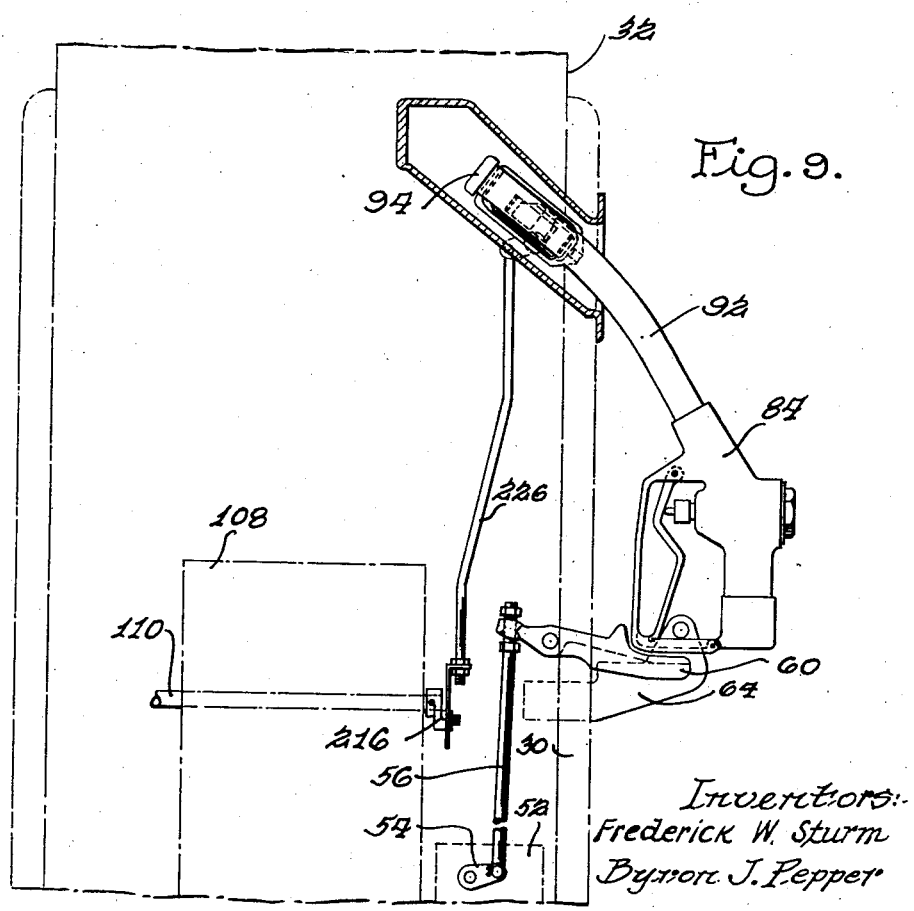

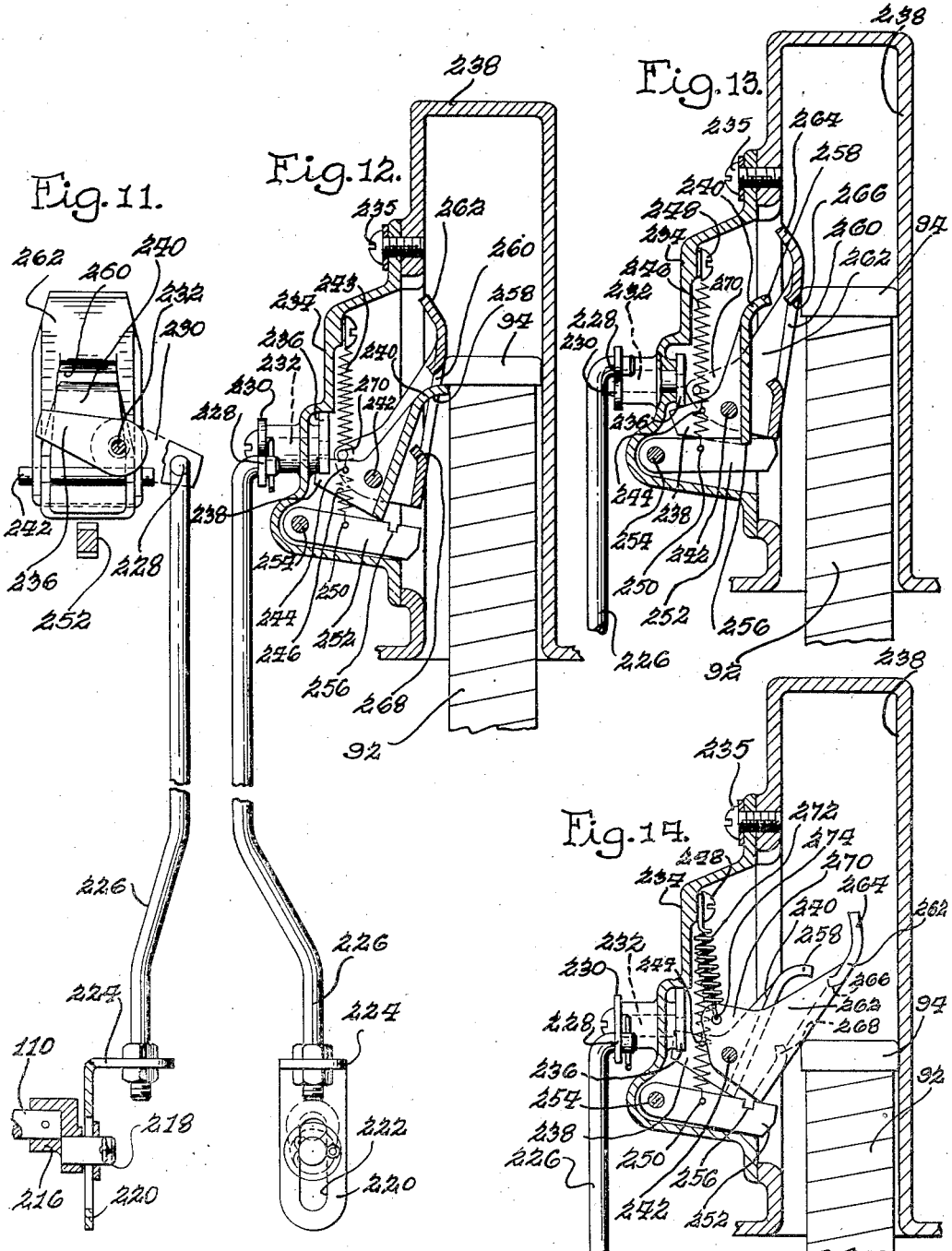

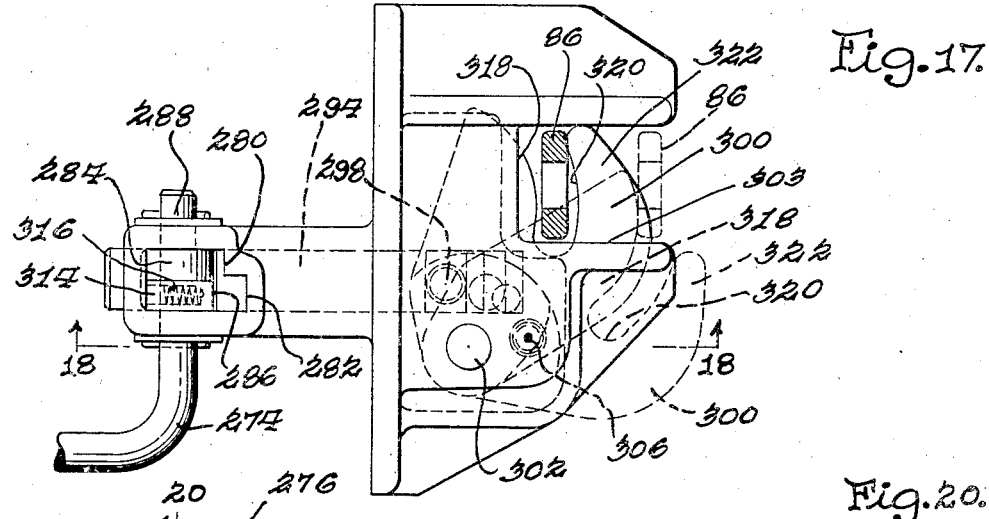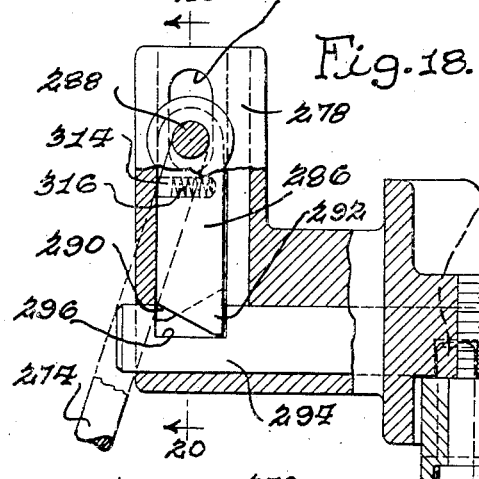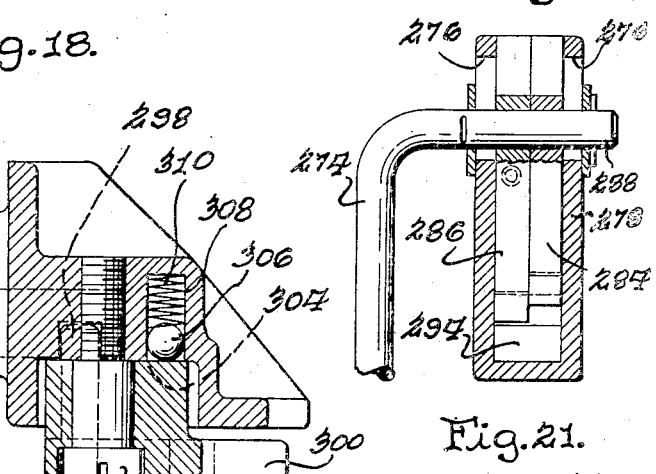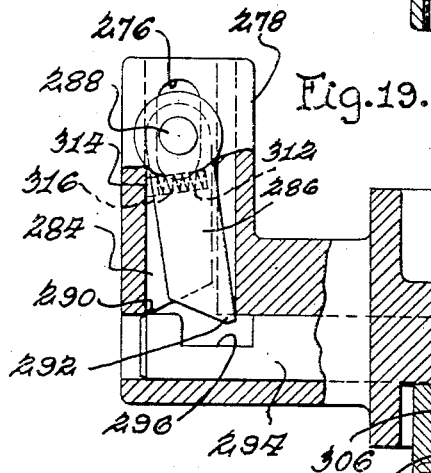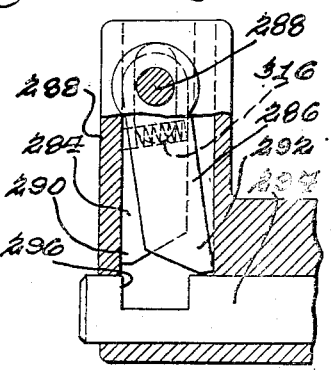

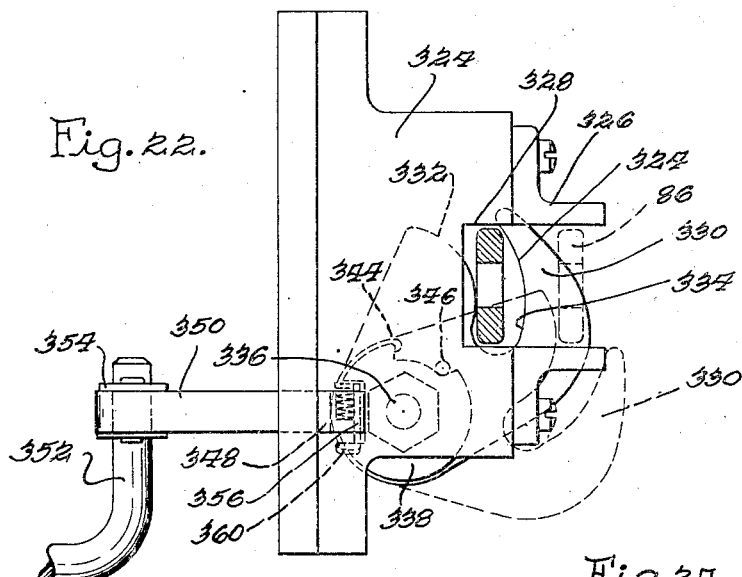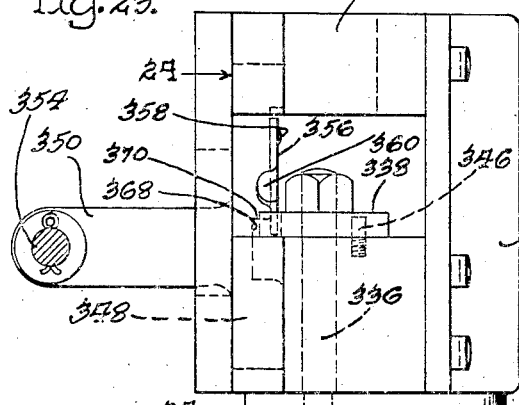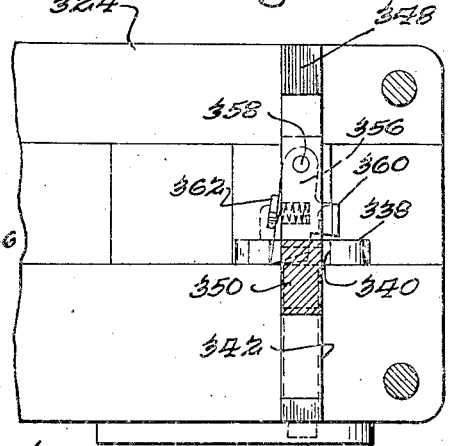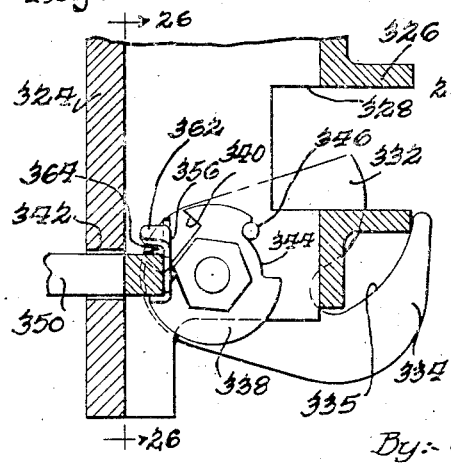

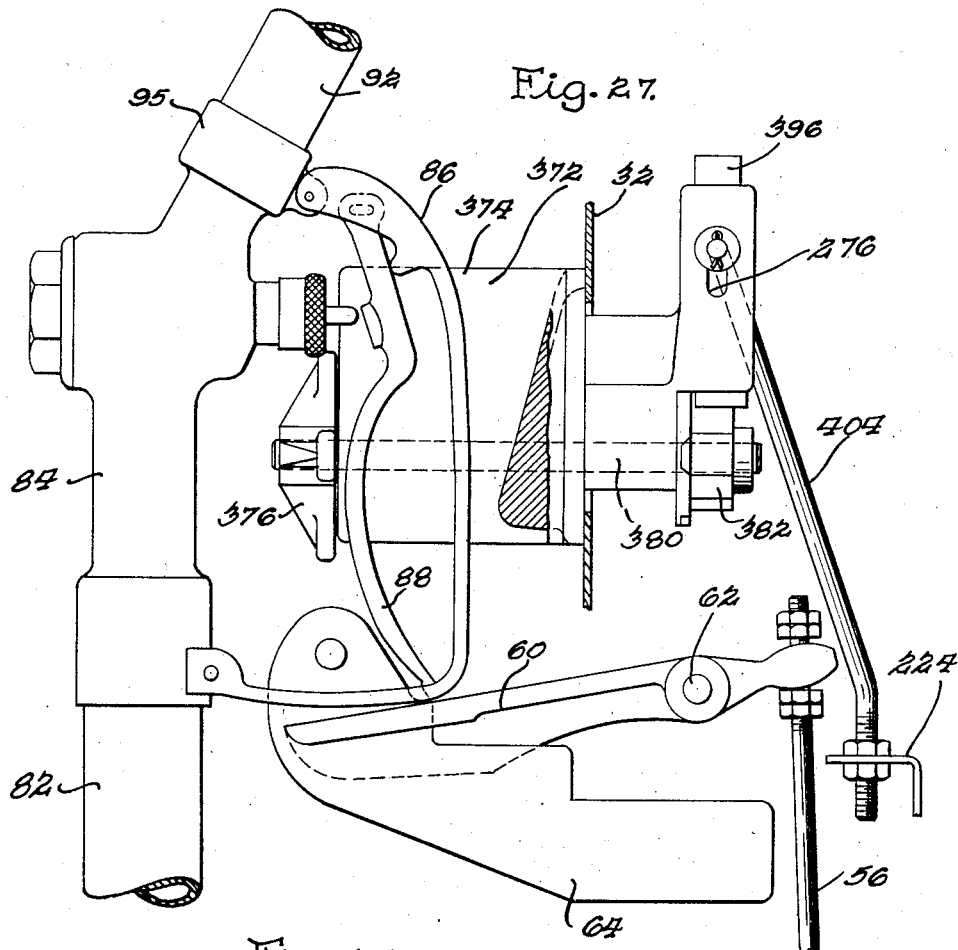
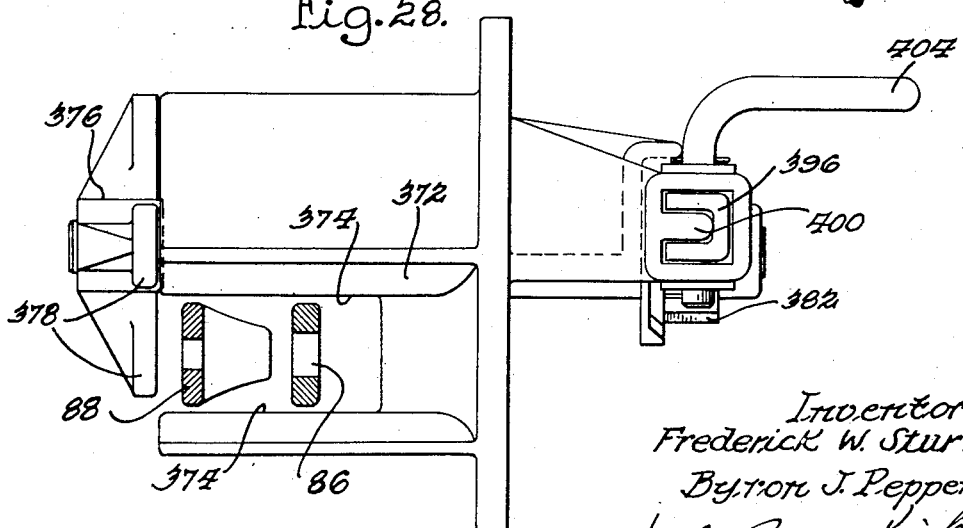

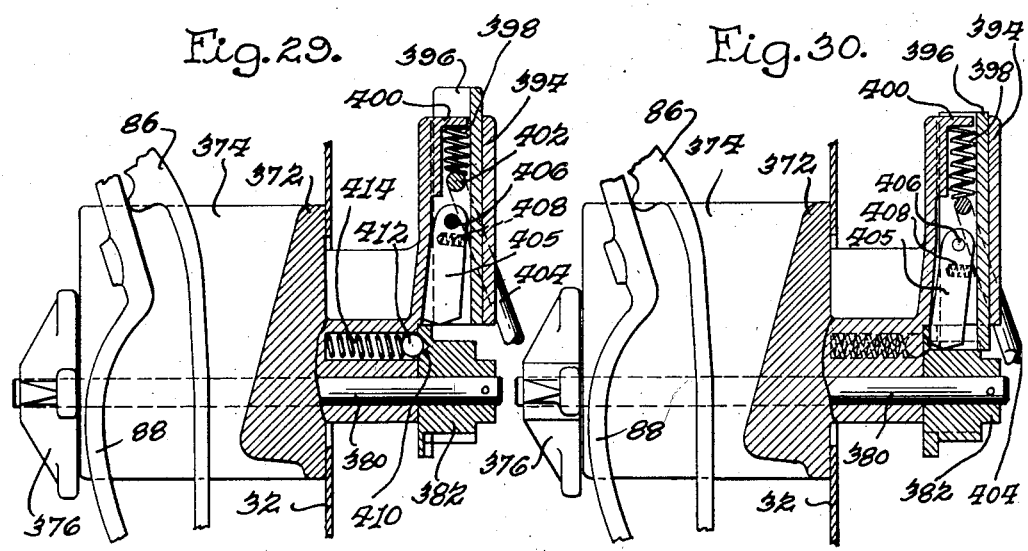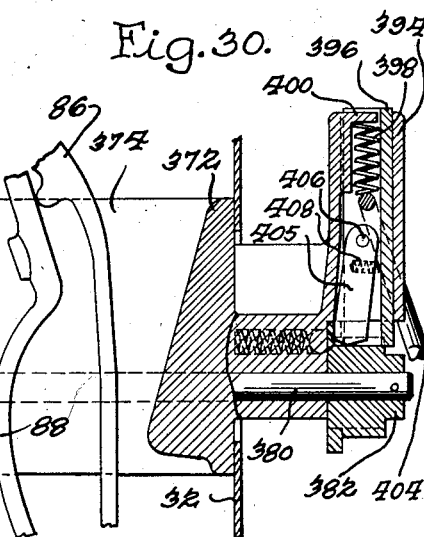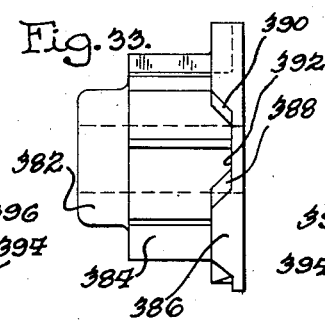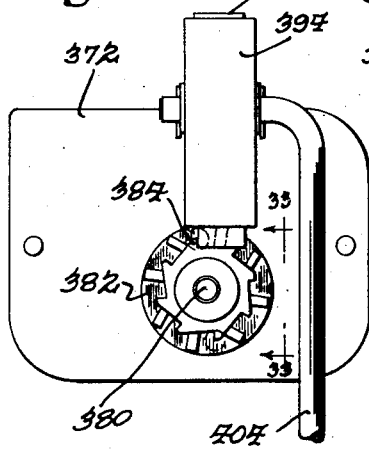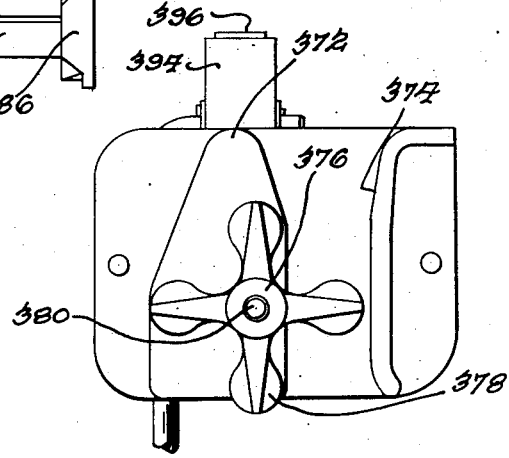

Patented Dec. 5, 1939

2,182,766

UNITED STATES PATENT OFFICE 2,182,766

LIQUID DISPENSING APPARATUS

Frederick W. Sturm and Byron J. Pepper, Fort Wayne, Ind., assignors to The Wayne Pump Company, Fort Wayne, Ind., a corporation of Maryland Application April 5, 1937, Serial No. 135,172

16 Claims. (Cl. 221—95)

This invention pertains to liquid dispensing apparatus and more particularly to reset interlocking mechanism for preventing dispensing of liquid from said apparatus until said apparatus has been reset to a predetermined position.

It is an object of this invention to provide reset interlocking mechanism for preventing liquid from being dispensed from said apparatus until said apparatus has been reset to initial position.

Another object of the invention is to provide reset interlocking mechanism for the hose nozzle of a liquid dispensing apparatus, said mechanism being controlled by the pressure of the liquid to be dispensed.

Yet another object of the invention is to provide an interlocking mechanism controlled by the hose nozzle and registering mechanism of a liquid dispensing apparatus.

A further object of the invention is to provide an interlock for the nozzle tube of a liquid dispensing apparatus which is entirely independent of the operating means for the liquid dispensing apparatus.

A yet further object of the invention is to provide a pressure controlled nozzle interlock and reset disconnecting mechanism for a liquid dispensing apparatus.

A still further object of the invention is to provide a mechanical interlock for a hose nozzle adapted to be operated by a register of a liquid dispensing apparatus.

Still another object of the invention is to provide an interlock for the nozzle guard of a liquid dispensing apparatus controlled by the registering mechanism.

In the drawings, which illustrate embodiments of the device, and wherein like reference characters are used to designate like parts—

Figure 1 is a sectional elevation through a liquid dispensing apparatus showing one form of interlock embodying the invention applied thereto;

Figure 2 is an enlarged fragmentary sectional elevation through the liquid dispensing apparatus illustrated in Figure 1, showing the associated setback mechanism and interlock.

Figure 3 is a fragmentary sectional top plan view of the interlock illustrated in Figures 1 and 2 with certain parts omitted, the section being taken through the nozzle end housing;

Figure 4 is a fragmentary sectional elevation taken substantially in the plane as indicated by the line 4—4 of Figure 2;

Figure 5 is a sectional elevation taken substantially in the plane as indicated by the line 5—5 of Figure 2;

Figure 6 is an enlarged sectional top plan view through the set-back mechanism and the operating means therefor shown in Figures 1, 2 and 3, the same being taken substantially in the plane as indicated by the line 6—6 of Figure 2;

Figure 7 is an enlarged end elevation partly in section of the pressure interlock latch mechanism shown in Figures 1 and 2, the same being taken substantially in the plane as indicated by the line 7—7 of Figure 2;

Figure 8 is an enlarged fragmentary elevation, partly in section, of the latch operating mechanism illustrated in Figures 1, 2 and 7, the section being taken through the pressure housing;

Figure 9 is an enlarged elevation, corresponding to Figure 2, showing a modified form of interlock mechanism applied thereto;

Figure 10 is an enlarged fragmentary top plan view of the interlock mechanism illustrated in Figure 9;

Figure 11 is an enlarged fragmentary elevation, partly in section, of a portion of the interlock mechanism illustrated in Figures 9 and 10 showing the association thereof with the reset shaft;

Figure 12 is an enlarged fragmentary transverse sectional elevation through the nozzle end housing showing the interlock illustrated in Figures 9, 10 and 11, the interlock being shown in operative position with respect to the nozzle end;

Figure 13 is a sectional elevation, corresponding to Figure 12, showing the interlock in inoperative position where the hose nozzle is being withdrawn;

Figure 14 is an enlarged sectional elevation, corresponding to Figures 12 and 13, showing the interlock in position where the hose nozzle is wholly withdrawn, and in a position to engage said hose nozzle when it is inserted in the nozzle end housing;

Figure 17 is an enlarged top plan view through the hose support and interlock illustrated in Figures 15 and 16, the full line position showing the interlock hook in nozzle guard engaging position, the dotted line position illustrating the released position thereof;

Figure 18 is an enlarged sectional elevation of the interlock mechanism illustrated in Figures 15, 16 and 17, the same being taken substantially in the plane as indicated by the line 18—18 of Figure 17 showing the interlock in operative position;

Figure 19 is an enlarged sectional elevation corresponding to Figure 17 showing the interlock mechanism in released position;

Figure 20 is an enlarged sectional elevation through the latch mechanism of the interlock illustrated in Figures 15 to 19 inclusive, the same being taken substantially in the plane as indicated by the line 20—20 of Figure 18;

Figure 21 is an enlarged fragmentary sectional elevation corresponding to Figure 19 showing the latch members in position when the locking hook is in the full line position as illustrated in Figure 17, but the register is in a position where it has been reset to zero;

Figure 22 is an enlarged top plan view through the hose support and interlock of another modified form of hose support and interlock, the full line position showing the interlock hook in nozzle guard engaging position, the dotted line position illustrating the released position thereof;

Figure 23 is an enlarged side elevation of the support and interlock illustrated in Figure 22 showing the same in interlocking position;

Figure 24 is an end elevation looking toward the right as viewed in Figure 23 from the lines 24—24 of said figure;

Figure 25 is an enlarged sectional top plan view of the interlock and hose hook illustrated in Figures 22 to 24 showing the mechanism in released position, the same being taken substantially in the plane as indicated by the line 25—25 of Figure 26;

Figure 26 is an enlarged fragmentary sectional elevation taken substantially in the plane as indicated by the line 26—26 of Figure 25;

Figure 27 is an enlarged side elevation of the hose hook support, switch operating means, and yet another modified form of interlock mechanism showing the same in interlocked relation with the hose nozzle but with the register reset to zero;

Figure 28 is an enlarged plan view through the interlock mechanism illustrated in Figure 27 looking down on said interlock, showing in section the nozzle guard and valve operating means in interlocked position;

Figure 29 is an enlarged side elevation of the interlock corresponding to Figure 27 showing the interlock in section and in position where the register has been reset to zero;

Figure 30 is a fragmentary sectional elevation corresponding to Figure 29 showing the interlock mechanism in interlock position and before the register has been reset to zero;

Figure 31 is an end elevation of the interlock looking toward the right as viewed in Figure 29;

Figure 32 is an end elevation of the interlock looking toward the left as viewed in Figure 29;

Figure 33 is an enlarged side elevation of the notched interlocking disk shown in Figure 32, the same looking in the direction of the arrows 33—33 of said Figure 32.

Figure 16:
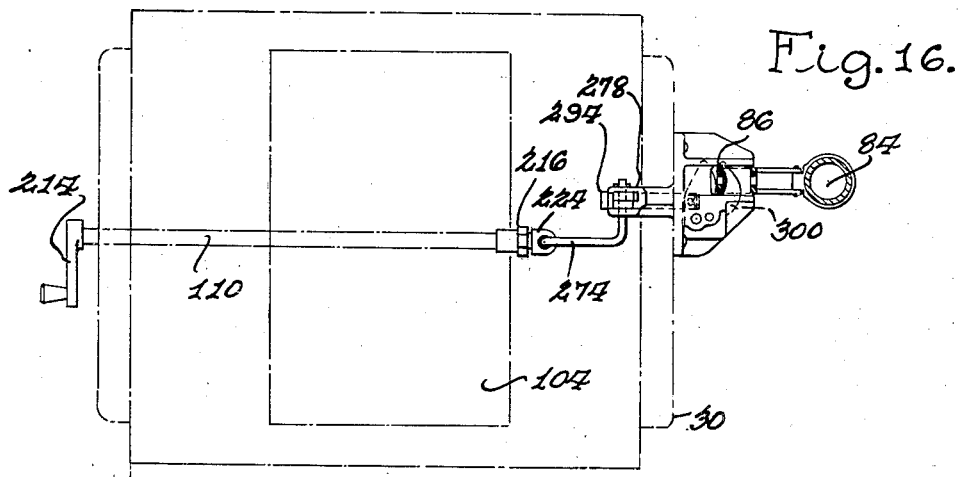
Figure 16 is an enlarged top plan view of the interlock mechanism illustrated in Figure 15.

Referring first of all more particularly to the liquid dispensing apparatus illustrated in Figure 1, and the form of interlock illustrated in Figures 2 to 5 inclusive, this dispensing apparatus 30 consists essentially of the casing or housing 32 provided with base 34. Within the casing there is provided a pump 36 shown of the rotary type, said pump being provided with the suction line 38 extending into the source of liquid supply or underground tank 40, the lower end of said suction line being provided with the foot valve 42.

The pump shown is adapted to be operated by the motor 44, the pulley 46 of the motor being rotatably connected to the pulley 48 of the pump, through the belt 50. The motor shown is of the electric type and is operated through any electrical source of supply, the operation of the motor being controlled by the switch 52, the switch arm 54 thereof being connected through the rod 56 to the inner arm 58 of the switch control member 60. Said switch control member 60 is pivoted as at 62 to a suitable support provided in the housing and extends outwardly of said housing adjacent the hose support 64.

The outlet side of the pump is connected through the pipe 66 to the air separator 68, the vented side of said air separator being connected to the vent pipe 70, extending upwardly to a raised portion of the casing. The outlet side of the air separator 68 is connected to the inlet side of the meter 72, said meter being shown as of the displacement type, such as shown in Patent No. 2,144,748, Arnold and Sturm, granted January 24, 1939. The outlet side of the meter is connected to the outlet pipe 74, which extends upwardly and is connected to the visi-gauge casting 76. The casting 76 is provided with the visi-gauge 78 and the outlet pipe 80, said pipe being connected to the dispensing hose 82 provided with dispensing nozzle 84. Said nozzle is provided with the nozzle guard 86 within which is pivotally mounted the hand operating lever 88 for controlling the discharge valve 90 of said nozzle.

The nozzle 84 is provided with the flexible or rigid discharge end 92 having the usual end rim 94 thereon, and said nozzle may be provided with a valve at 95 opening with pressure but closing when the pump is inoperative, thereby preventing drainage from the hose. The nozzle as shown in Figures 1 and 2 is in its supported position, namely, when the switch 52 is open, that is, the outer arm of the switch control member 60 is in depressed or lowered position, the nozzle being supported on the support 64 through the guard 86, and the end of the nozzle being received in the nozzle end housing or receptacle 96 fixedly secured to the housing 32. In order then to operate the switch 52 to closed position it is necessary to remove the nozzle 84 from its support in order to raise the switch control member to close the switch 52 to start operation of the motor.

The meter 72 is provided with the usual rotary or suitably operated valve operating the rotatable meter shaft 98, said shaft rotating proportionally to the amount of liquid passing through the meter. The meter shaft 98 is connected to the registering mechanism 100 which, as shown, is of the computer type, and may be of a similar construction to that illustrated in Patent No. 2,111,996, Slye, granted March 22, 1938, wherein the variator indicated generally at 102 drives the indicator or register indicated generally at 104.

The indicating mechanism is provided with the window 106 for indicating the amount of units such as gallons dispensed, while the other window 108 shows the computed price of the liquid dispensed. This registering mechanism may generally be of the same construction such as illustrated in Patent No. 2,111,996, Slye, granted March 22, 1938.

In the mechanism illustrated in Figures 1 to 8 inclusive, the register 104 is provided with the reset shaft 110, said reset shaft being provided with the clutch member 112 adapted to have clutching engagement with the member 114 provided on the jack shaft 116, said jack shaft 116 being provided adjacent the outer end thereof with the reset crank 118. The shaft 116 is journaled in the bracket 120 and the spring 122 is disposed between the journal 123 and the disk 124 provided on the shaft 116, said spring normally urging the shaft 116 outwardly to a point where the clutch member 114 normally contacts the rear end of the journal 123.

The bracket 120 is provided with the pressure housing 126, one side of which is connected to the pipe 128, said pipe being connected to the pressure side of the pump 36 adjacent the inlet side of the meter as at 130. The housing 126 is closed by means of plate 132 suitably secured thereto as at 134, the flexible diaphragm 136 being secured between the housing 126 and the plate 132, the diaphragm being provided with the plunger 138 extending outwardly of the member 132 and in engagement with the declutching lever 140. The lever 140 is pivoted as at 142 to the pedestal 144 provided on the member 132, the lever being normally urged in a counter-clockwise direction (as viewed in Figure 6) by means of the spring 146 interposed between the member 132 and the extension 148 of the lever 140. The lever 140 is provided with the head 150 which is preferably bifurcated, said head embracing and engaging the clutch member 112 for slidably operating said clutch member into and out of engagement with the member 114.

The opposite end of the reset shaft is provided with the crank 152, said crank being provided with the outwardly extending pin 154, adapted to underlie the arm 156 of the lever 158, said lever being pivoted as at 160 to the pedestal 162 supported in the casing by means of the bracket 164. The lever 158 is provided with the oppositely extending arm 166 pivotally connected to the lower end of the rod 168, the upper end of said rod being pivotally connected to the lever 170, said lever being non-rotatably mounted on the shaft 172, rotatably journaled on the pedestal 174 supported adjacent the nozzle end receiving housing 96.

The shaft 172 is provided with upwardly extending lever 176, the lever 176 being normally urged toward the left as viewed in Figure 5 and Figure 7 by means of the spring 178, one end of which is secured to said lever 176, the other end of which is secured to the plate member 180 which is secured as at 182 to the pressure housing 184.

The diaphragm 186 is secured between the pressure housing 184 and the plate 180, said diaphragm being provided with the plunger 188. The housing 184 is secured to the pressure side of the pump through the line 190 and line 128, said line 190 as shown being secured as at 191 to the housing 126. When the register 104 is set to zero, the lever 176 is supported in a raised position by shoulder 192 provided on the lever 194, said lever being pivoted as at 196 to the guide pedestal 198 provided on the plate member 180, the lever being urged to a position under the lever 176 by means of spring 200. The shaft 172 is provided with the outer upwardly extending lever 202 adapted to engage the head 204 provided on the stem 206 of the latch member 208, the latch member being provided in the housing 210 and adapted to be extended into the housing 96, the latch member normally being withdrawn into its housing 210 by means of spring 212 disposed between the housing and the member 204.

Assuming the nozzle to be in supported position as shown in Figure 1, and assuming that the register 104 is in zero position, when it is desired to dispense gasoline the hose is removed from the support 64 and the switch operating member 60 is raised, closing the switch 52. Closing the switch 52 starts the motor 44, which causes the pump 36 to be operated, supplying gasoline from the source of supply 40 to the meter 72. Passage of liquid through the meter 72, it being assumed that the nozzle valve 90 is open, causes rotation of the meter shaft 98, whereupon the volume of liquid dispensed is indicated in the window 106, and the computed cost thereof appears in window 108.

Operation of the pump causes pressure to be built up in the line 128, causing the diaphragm 136 to move the plunger 138 toward the right as viewed in Figure 6, whereupon the clutch operating lever 140 moves the clutch member 112 out of engagement with the clutch member 114, whereupon the crank 118 normally is disconnected from the reset shaft 110, though it is to be noted that the crank 118 may be pushed inwardly against the spring 122 to cause engagement between the clutch members 114 and 112. Liquid pressure is also built up in the line 190, which causes the plunger 188 to move outwardly, causing the shoulder 192 to be moved from supporting relation to the lever 176, the spring 178 moving the lever behind the shoulder 192, and the lever resting upon the extended plunger 188.

When the switch 52 is opened, thereby stopping operation of the pump 36, the liquid pressure falls in the line 128, causing the spring 146 to move the clutch member 112 into engagement with the clutch member 114. The pressure also falling in the line 190 causes the plunger 188 to move inwardly, whereupon the lever 176 moves into blocking relation with respect to the plunger 188. Thus, restarting the motor and pump by closing the switch 52 will not permit any movement of the plunger 188 due to the fact that the lever 176 will be in blocking relation with respect to the plunger 188. Movement of the lever 176 into blocking relation with respect to the plunger 188 causes rotation of shaft 172, which in turn causes the lever 202 to engage the head 204 to move the latch 208 inwardly of the nozzle end housing 96.

Thus when the nozzle is inserted into the nozzle end housing, the latch will engage beneath the rim 94, and when the lever 176 is in blocking relation to the plunger 188, the nozzle cannot be withdrawn as the latch 208 extends inwardly of the nozzle end housing 96. No liquid can then be dispensed from the liquid dispensing apparatus until the crank 118 has been revolved through 360 deg. to reset the register 104 to zero. Movement of the crank 118 through 360 deg. will cause rotation of the crank 152, the crank pin 154 engaging the lever 156 on the top thereof, moving the rod 168 upwardly, causing the lever 176 to be moved out of blocking relation with respect to the plunger 188. The movement of the lever 176 is beyond the shoulder 192, whereupon the spring 200 will cause the shoulder 192 to be moved below the lever 176 to support it against the action of the spring 178, whereupon the cycle of operation just explained can be repeated to dispense a new amount of gasoline from the zero position of the register 104.

Referring now to the modification illustrated in Figures 9 to 14 inclusive, it will be understood that the same operating mechanism for the pump is contemplated such as already described with respect to Figure 1, and similar numbers are used to designate similar parts. In this case, the reset shaft 110 is extended outwardly of the casing 32 and is directly provided with the reset crank 214. The opposite end of the reset shaft is provided with the crank 216, shown so that the crank pin 218 is in the lowermost position when the register is at zero, though it is only necessary that the reset shaft 110 be revolved through 360 deg. in resetting to zero.

The link 220 is loosely connected through the slot 222 to the pin 218. The upper end of the link being flanged at 224 and secured to the push rod 226. The upper end of the push rod is pivoted as at 228 to the push rod lever 230, said lever being non-rotatably mounted on the lever shaft 232 journaled in the housing 234 secured as at 235 to the nozzle end housing 238, said housing being for the purpose of receiving the end 92 of the nozzle 84. The shaft 232 is provided inwardly of the housing 234 with the latch operating lever 236 non-rotatably mounted on said shaft and being disposed to overlie the shoulder 238 of the latch 240, said latch being pivoted as at 242 to the housing 234, and being provided with a suitable spring 243, one end of which is secured to the extension 238 as at 244, the other end being fixedly secured to the housing 234, the spring being a very light one and, as shown in the figure, is mounted beyond the spring 246, the upper end of said spring 246 being secured to the housing 234 as at 248, the lower end of said spring being secured as at 250 to the dog 252. One end of said dog is pivoted as at 254 to the housing 234, said dog extending toward the housing 238 and being provided with the locking notch 256.

The latch 240 is provided with the locking end 258 extending toward the housing 238 and through the aperture 260 provided in the trigger member 262, said trigger member being likewise pivoted as at 242. The trigger member is provided with the guide portions 264, 266 and 268 disposed so that they will not interfere with the insertion or withdrawal of the nozzle end member 94. The trigger member 262 is provided with the ear 270 to which the operating spring 272 (shown in Figure 14) is secured as at 274, said spring being heavier than the hereinbefore mentioned springs 243 and 246. The upper end of the spring 272 is likewise secured to the casing 234 as at 248.

Assuming the nozzle to be in the position as shown in Figure 9, that is, disposed on the support 64, when it is desired to dispense gasoline it is first necessary to turn the crank 214 to reset the register 108 to zero position. Resetting the register rotates the crank 216 through 360 deg., causing the push rod 226 to move upwardly rotating the shaft 232 and consequently causing the latch operating lever 236 to rotate downwardly in a counter-clockwise direction as viewed in Figure 11. Rotation of the latch operating lever downwardly causes the shoulder 238 to move downwardly, thus withdrawing the latch inwardly of the housing 238 to a position such as shown in Figure 13, permitting withdrawal of the nozzle from the housing 238, whereupon the nozzle may be removed from the support 64, the lever 60 may be raised to close the switch 52 to start the motor and liquid may be dispensed.

Withdrawal of the nozzle end from the housing 238 permits the trigger 262 to move inwardly of the housing 238 as shown in Figure 14 by action of the spring 272, thereby depressing the dog 252 (as shown in Figure 14) to release the end of the latch from the notch 256, thus permitting the latch end 258 to be moved inwardly into the housing 238. When the nozzle end is again inserted in the housing 238 it moves the trigger member 262 outwardly slightly, the nozzle end 94 will slightly depress the latch end 258, but not to a sufficient extent to cause engagement between the latch and the notch 256, whereupon the end 94 is engaged beneath the rim thereof preventing withdrawal of the nozzle until the register has been again reset to zero.

Referring now to the modification illustrated in Figures 15 to 21 inclusive, as before, it is understood that the same operating mechanism for the liquid dispensing apparatus is contemplated such as already described with respect to Figure 1, similar numerals designating similar parts. In this case the reset shaft 110 of the register 104 is provided with the reset crank 214, and at the opposite end thereof it is provided with the crank 216 shown so that the crank pin 218 is in its lowermost position when the register is at zero. It is a necessary function of the computer for the reset shaft to revolve 360 deg. The link 220 is loosely connected through the suitable slot to the pin 218, the upper end of the link being flanged as at 224 for the reception of the push rod 274.

The upper end of the push rod or latch operating rod 274 is bent at right angles and extends through the elongated slots 276 in the latch guide housing 278. The latch guide housing is provided with the latch guides 280 and 282 in which the locking latch 284 and the retaining latch 286 are slidably mounted, said latches being pivoted to the flanged end 288 of the latch operating rod 274. The locking latch 284 is provided with the latching end 290 facing rearwardly of the housing and being shorter than the retaining end 292 of the retaining latch 286, said end 292 facing forwardly in the housing. The housing 278 is provided with the latching bolt 294 slidably mounted in said housing and underlying the latch members 284 and 286, said bolt being provided with the notch 296 adjacent the latch end thereof.

The bolt 294 extends forwardly in the housing and is pivotally connected as at 298 to the biased upwardly extending pin provided in the locking hook 300, said hook being pivoted to the housing as at 302, so disposed as to project slightly inwardly of the guard receiving recess 303 of the housing 278 when the hook is in receiving position (Figure 17—dotted lines). The hook extends across the slot 303 when the hook has received the guard 86 as shown in full line position in Figure 17. The locking hook is provided with a depression 304 adapted to be engaged by the ball 306 mounted in the recess 308 and urged downwardly by the spring 310 engaging in recess 304 when the locking hook is in open position. The latch 286 is recessed as at 312 and is provided with the plunger 314 urged outwardly of the latch by means of the spring 316 urging the latch in a forward direction.

When the locking hook is open it is disposed as shown in the dotted lines in Figure 17, it being seen that the portion 318 defining the rearward edge of the slot 320 is disposed to be engaged by the nozzle guard 86 in applying the hose nozzle 84 to supported position on its support 64. Movement of the nozzle 84 to its supported position causes the nozzle guard 86 to move the locking hook in a counterclockwise direction as viewed in Figure 17 to cause the guard to be received in the slot 320 formed by the rear member 318 and the forward member 322, whereupon movement of the guard to the full line position as viewed in Figure 17 causes the locking hook to assume the position as illustrated in Figure 17.

Figure 15:
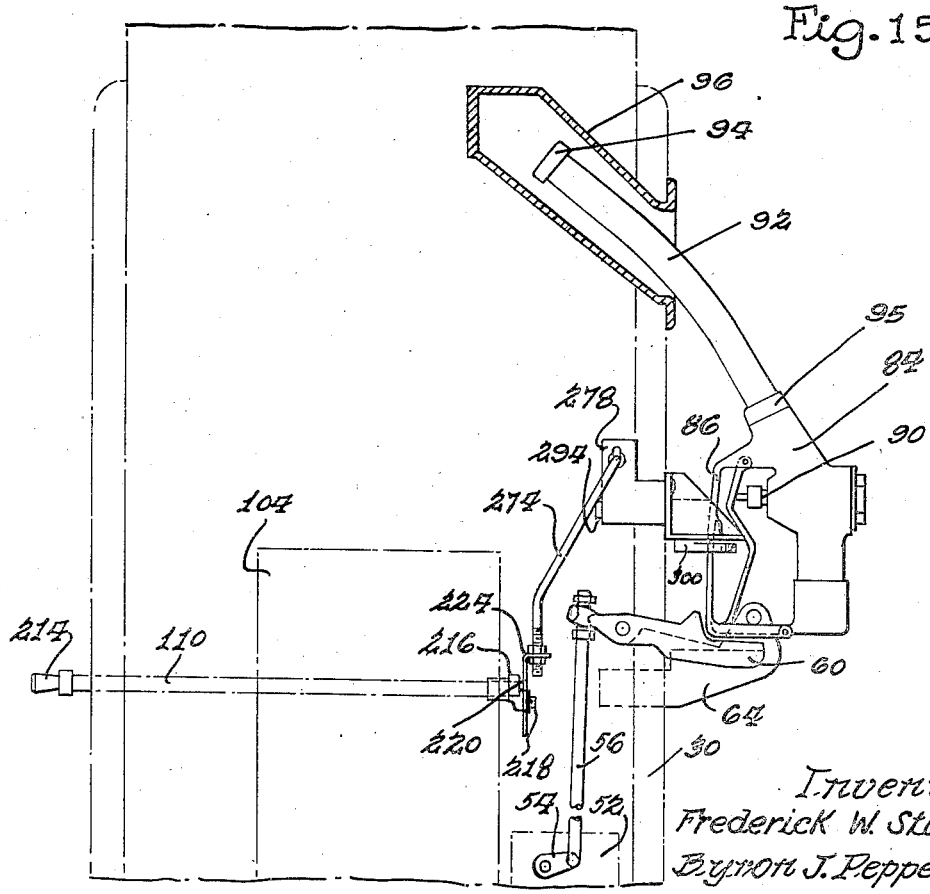
Figure 15 is a fragmentary elevation partly in section, corresponding to Figure 2, showing another modified form of interlock.

In reset zero position and with the hook open, the bolt 294 is in the position as illustrated in Figure 19 wherein the lower end 290 of the locking latch 284 is supported on the rear shoulder defining the notch 296 of the bolt 294 and the spring 316 has urged the retaining latch 286 in a forwardly direction wherein the end 292 projects slightly within the recess 296. Movement of the locking hook to the full line position as shown in Figure 17 causes the bolt 294 to be moved rearwardly. Rearward movement of the bolt causes the latch 286 to move to engage the rear portion of its slot 282, and as the recess 296 registers with the latch 284, the latch members will drop into the recess, assuming a position as shown in Figure 18. With the parts in this position it is impossible to remove the nozzle 84 from the position as illustrated in Figure 15 where the nozzle end 92 extends within the nozzle receptacle or housing 96.

In order to remove the nozzle from interlock position the crank 214 is revolved through 360 deg., causing the crank 216 to raise the push rod 274. Raising the push rod 274 causes upward movement of the latches, withdrawing the latches from the recess 296, whereupon the spring 316 will move the retaining latch 286 in a forward direction, causing the lower end 292 thereof to assume a supported position on the bolt 294 as illustrated in Figure 21. With the latches in the position as illustrated in Figure 21, the nozzle can then be removed from its support 64, outward movement causing the guide to move the locking hook to the dotted line position as viewed in Figure 17, the bolt 294 being slid forwardly, the lower end 290 of the latch 284 overlying the rear end of the bolt before the lower end 292 of the latch 286 is released, whereupon the parts are in position to again receive the nozzle in interlocked position (Figure 19).

Referring now to the modification illustrated in Figures 22 to 26 inclusive, the interlock housing 324 is provided with the vertical guides 326 for reception of the nozzle guard 86 within the recess 328 provided in said housing. Adjacent the recess there is pivoted the locking hook 330 provided with the rear portion 332 and the spaced forward portion 334 forming the guard receiving recess 335. The rear member 332, when the guard is in open position, assumes such a position with respect to the recess 328 that said member will be contacted by the nozzle guard 86 to move the hook to interlocking position as shown in full lines in Figure 22, when the nozzle is being placed in supported position on the support 64 and the nozzle end is being inserted in its housing. The hook 330 is secured to the shaft 336, said shaft being journalled in the housing 324 and provided with the locking disk 338, said disk having a cut out portion 340 therein so disposed that it registers with the guide 342 provided in the rear face of the housing 324. The disk is also provided with the cut out portion 344 adapted to have contact with the stop 346 provided in the housing for limiting the open and closed position of the hook.

The latch bar 348 is slidably mounted in the recess 342 and is provided with the outwardly extending arm 350 to which the push rod 352 is pivoted as at 354, the push rod 352 being similar to the push rod 274 and, as before, extends downwardly and is secured to the flange 274 of the link 216. The bar 348 is provided with the latch 356 pivoted thereto as at 358, the latch being provided with the spaced shoulders 360 and 362, the longer shoulder being urged into contact with the bar 348 by the spring 364 disposed between the shoulder 362 and the bar 348. The latch 356 is provided with the locking end 366, said end being cut away or longer on the side of the shoulder 362 than on the side of the shoulder 360.

When the interlock is in released position with the locking hook in the dotted line position as viewed in Figure 22, the end 366 of the latch is disposed in supported position on the disk 338, the end 366 slightly projecting into the notch 340 (Figure 26). When the nozzle guard is inserted in the recess 328 moving the hook to the full line position as shown in Figure 22, the shaft 336 is revolved to move the notch 340 to a position of registry or alignment with the guide 342, causing the opposite side of the recess 340 to engage the long side of the end 366 of the latch 356 to move said latch against the spring 364. Such movement causes the latch to be moved to permit the locking bar 348 to drop partially into the notch 340 to remove the cut out portion 368 from registry with the notch 340, the shoulder 370 adjacent said notch forming locking means to prevent the hook 330 from being revolved to release the nozzle guard.

In order to release the nozzle guard to permit the nozzle 84 to be removed from its support 64, it is necessary to rotate the resetting crank 214 through 360 deg., causing the crank 218 to move the push rod 352 upwardly. Upward movement of the push rod 352 causes registry of the cut out portion 368 in the latch 348 with the notch 340 of the locking disk 338. Upward movement of the locking bar 348 will move the latch 356 above the locking disk 338, and the spring 364 will cause the latch to engage on top of the locking disk 338, whereupon the hook 330 may be revolved to a position as illustrated in full lines in Figure 25, it being seen that the shoulder 370 will seat on top of the disk 338 before the latch end 366 can drop into the notch 340. The interlock is then in a position for again receiving the nozzle guard 86 of the nozzle 84.

Referring now to the modification illustrated in Figures 27 to 31 inclusive, the interlock housing 372 is secured to the casing 32 adjacent the support 64 for the hose nozzle 84. The switch operating member 60 is pivoted at 62 adjacent the support 64, and extends inwardly of the housing and is provided with the switch operating rod 56. The housing 372 is slotted as at 374 for the reception of the nozzle guard 86, and said housing adjacent the outer end of said slot is provided with the turnstile 376, said stile having the spokes 378, one of which is always adapted to overlie the slot 374. The turnstile is mounted on the shaft 380 extending through the housing and provided on its inner end with the interlocking disk 382. Said disk 382 is provided with the elongated locking shoulders 384 and the shorter latching shoulders 386, the latching shoulders being separated by the sloping portions 388 and 390 forming the notches 392.

The housing 372 is provided adjacent the inner end thereof with the vertically disposed bolt housing 394 in which the bolt 396 is slidably mounted. The bolt 396 is urged downwardly by means of the spring 398 disposed between the shoulder 400 of the housing 394 and the transverse end 402 of the bolt operating rod 404, said rod corresponding to the rod 274, the lower end of said rod being connected to the flange 224 of the link operated by the crank 218. The bolt 396 is provided with the latch member 405 pivoted thereto as at 406, the spring 408 being disposed in a suitable recess in the latch 405 and urging said latch in a forwardly direction. The interlocking disc on the underside thereof is provided with suitable indentations 410 adapted to be engaged by the ball 412 spring-pressed by the spring 414 to indicate the horizontal position of the overlying spoke 378 of the turnstile.

When the register is in reset zero position the latch 405 is supported on the vertically disposed latching shoulder 386 of the interlock disc 382 as shown in Figure 29, in which position the guard 86 can be removed from the slot 374. Removing the guard 86 from the slot rotates the stile in a counterclockwise direction as viewed in Figure 31, causing the notch 392 between adjacent shoulders 388 and 390 to register with the latch 405, permitting the spring 398 to thrust the bolt downwardly to cause the bolt to engage one of the locking shoulders 384 as illustrated in Figure 32. In this position, when the hose nozzle is again applied to its support, the guard being inserted in the slot 372 causes rotation of the turnstile in a clockwise direction as viewed in Figure 31.

Rotation of the interlock disc will be permitted as the disc will rotate in a counterclockwise direction as viewed in Figure 32, causing the bolt to engage the succeeding shoulder 384, but the nozzle having once been inserted in the slot, it cannot be withdrawn as it will be necessary to rotate the shaft 380 in a clockwise direction as viewed in Figure 32 (counterclockwise as viewed in Figure 31). In order to remove the nozzle from its support 64 to release the guard 86 from the slot, it is necessary to reset the register to zero, causing the member 224 to move the rod 404 upwardly. Movement of the rod upwardly will move the bolt 396 upwardly where the latch member 405 will be pressed forwardly in its housing and will be seated upon the periphery of the latching shoulder 386, thereby permitting the shaft 380 to be rotated and the mechanism to be moved to a position where it can be again interlocked with the nozzle guard.

It is to be understood that we do not wish to be limited by the exact embodiments of the device shown, which are merely by way of illustration and not limitation, as various and other forms of the device will of course be apparent to those skilled in the art without departing from the spirit of the invention or the scope of the claims.

What is claimed is:

1. In liquid dispensing apparatus, the combination of a meter the inlet side of which is adapted to be connected to means for supplying liquid to be measured thereto, a discharge line connected to the outlet side of said meter, said discharge line including a discharge hose and nozzle therefor, a register operated by the meter, the operation of the register being proportional to the amount of liquid dispensed, a reset shaft for said register, reset shaft operating means, a support for said nozzle, means adjacent said support engageable with said nozzle and controlled by the pressure from said pump for locking said nozzle on said support, and means controlled by said reset shaft operating means for rendering said last named means inoperative when said register has been reset to a predetermined position.

2. A latching device for the nozzle end of a liquid dispensing apparatus including a latching member adapted to engage said nozzle, a shaft for controlling movement of said latch member, a pressure housing provided with a pressure responsive member, said housing controllably receiving pressure for operating said pressure responsive member, locking means on said shaft and housing preventing operation of said latching member when in predetermined position, said locking means when in another predetermined position preventing operation of said shaft and latch member, said pressure responsive member being movable with respect to said locking means between said positions.

3. In liquid dispensing apparatus, the combination of a meter the inlet side of which is adapted to be connected to means for supplying liquid to be measured thereto, a discharge line connected to the outlet side of said meter, said discharge line including a discharge hose and nozzle therefor, a register operated by the meter, the operation of the register being proportional to the amount of liquid dispensed, a reset shaft for said register, reset shaft operating means, a support for said nozzle, a nozzle end housing adapted to receive the nozzle end when said nozzle is supported on said support, locking means operated by the nozzle when inserted in said housing to lock said nozzle on said support, said locking means including a trigger member and a latch member normally urged toward the nozzle receiving portion of the housing, a dog normally urged toward one of said members for locking said latch member in inoperative position, and means operated by said register to move said latch member to an inoperative position to be engaged by said dog to permit removal of said nozzle from said support when said register has been reset to a predetermined position.

4. In liquid dispensing apparatus, the combination of a meter the inlet side of which is adapted to be connected to means for supplying liquid to be measured thereto, a discharge line connected to the outlet side of said meter, said discharge line including a discharge hose and nozzle therefor, a register operated by the meter, the operation of the register being proportional to the amount of liquid dispensed, a reset shaft for said register, reset shaft operating means, a support for said nozzle, a housing disposed adjacent said support adapted to receive a portion of said nozzle, a locking hook disposed adjacent said housing adapted to be moved to over-lie the nozzle portion when received by said housing, a bolt movable by said hook, a member adapted to engage said bolt to lock said hook in nozzle engaging position, and means operated by said register to render said last named member inoperative to permit removal of said nozzle from said support when said register has been reset to a predetermined position.

5. In liquid dispensing apparatus, the combination of a meter the inlet side of which is adapted to be connected to means for supplying liquid to be measured thereto, a discharge line connected to the outlet side of said meter, said discharge line including a discharge hose and nozzle therefor, a register operated by the meter, the operation of the register being proportional to the amount of liquid dispensed, a reset shaft for said register, reset shaft operating means, a support for said nozzle, a housing disposed adjacent said support adapted to receive a portion of said nozzle, a locking hook disposed adjacent said housing adapted to be moved to over-lie the nozzle portion when received by said housing, a bolt movable by said hook, a pair of members pivotally connected and movable toward said bolt, one of said members supporting said members on said bolt when said hook is in a position to receive the nozzle portion, the other of said members locking said hook in nozzle receiving position, and means operated by said register to render said last named member inoperative to permit removal of said nozzle from said support when said register has been reset to a predetermined position.

6. In liquid dispensing apparatus, the combination of a meter the inlet side of which is adapted to be connected to means for supplying liquid to be measured thereto, a discharge line connected to the outlet side of said meter, said discharge line including a discharge hose and nozzle therefor, a register operated by the meter, the operation of the register being proportional to the amount of liquid dispensed, a reset shaft for said register, reset shaft operating means, a support for said nozzle, a housing disposed adjacent said support adapted to receive a portion of said nozzle, a locking hook disposed adjacent said housing adapted to be moved to overlie the nozzle portion when received by said housing, a bolt having one end engageable with a portion of said hook whereby movement of said hook causes reciprocal movement of said latch, the opposite end of said latch being provided with a recess, a pair of members pivotally connected and movable toward said bolt, one of said members supporting said members on said bolt when said hook is in a position to receive the nozzle portion, the other of said members extending into said notch when said hook is in open position but movable by movement of said bolt to permit said members to be received in said notch to lock said hook in nozzle receiving position, and means operated by said register to render said last named member inoperative to permit removal of said nozzle from said support when said register has been reset to a predetermined position.

7. In liquid dispensing apparatus, the combination of a meter the inlet side of which is adapted to be connected to means for supplying liquid to be measured thereto, a discharge line connected to the outlet side of said meter, said discharge line including a discharge hose and nozzle therefor, a register operated by the meter, the operation of the register being proportional to the amount of liquid dispensed, a reset shaft for said register, reset shaft operating means, a support for said nozzle, a housing disposed adjacent said support adapted to receive a portion of said nozzle, a locking hook disposed adjacent said housing adapted to be moved to over-lie the nozzle portion when received by said housing, a bolt having one end engageable with a portion of said hook whereby movement of said hook causes reciprocal movement of said latch, the opposite end of said latch being provided with a recess, a pair of members pivotally connected and movable toward said bolt, one of said members supporting said members on said bolt when said hook is in a position to receive the nozzle portion, the other of said members extending into said notch when said hook is in open position but movable by movement of said bolt to permit said member to be received in said notch to lock said hook in nozzle receiving position, and means operated by said register to raise said members to a position where the second of said members is adapted to be supported on said bolt whereby said members are rendered inoperative to permit removal of said nozzle from said support when said register has been reset to a predetermined position.

8. In liquid dispensing apparatus, the combination of a meter the inlet side of which is adapted to be connected to means for supplying liquid to be measured thereto, a discharge line connected to the outlet side of said meter, said discharge line including a discharge hose and nozzle therefor, a register operated by the meter, the operation of the register being proportional to the amount of liquid dispensed, a reset shaft for said register, reset shaft operating means, a support for said nozzle, a housing disposed adjacent said support adapted to receive a portion of said nozzle, a locking hook disposed adjacent said housing adapted to be moved to overlie the nozzle portion when received by said housing, a locking disk movable by said hook and a member movable to locking relation with said disk when said hook is in nozzle received position, and means operated by said register to render said last named member inoperative to permit removal of said nozzle from said support when said register has been reset to a predetermined position.

9. In liquid dispensing apparatus, the combination of a meter the inlet side of which is adapted to be connected to means for supplying liquid to be measured thereto, a discharge line connected to the outlet side of said meter, said discharge line including a discharge hose and nozzle therefor, a register operated by the meter, the operation of the register being proportional to the amount of liquid dispensed, a reset shaft for said register, reset shaft operating means, a support for said nozzle, a housing disposed adjacent said support adapted to receive a portion of said nozzle, a locking hook disposed adjacent said housing adapted to be moved to over-lie the nozzle portion when received by said housing, a locking disk rotatable by said hook, a plurality of members movable to locking position when said hook is in nozzle receiving position to prevent removal of said nozzle from said support, and means operated by said register to render one of said last named members inoperative to permit removal of said nozzle from said support when said register has been reset to a predetermined position.

10. In liquid dispensing apparatus, the combination of a meter the inlet side of which is adapted to be connected to means for supplying liquid to be measured thereto, a discharge line connected to the outlet side of said meter, said discharge line including a discharge hose and nozzle therefor, a register operated by the meter, the operation of the register being proportional to the amount of liquid dispensed, a reset shaft for said register, reset shaft operating means, a support for said nozzle, a housing disposed adjacent said support adapted to receive a portion of said nozzle, a locking hook disposed adjacent said housing adapted to be moved to over-lie the nozzle portion when received by said housing, a locking disk rotatable by said hook, a vertically movable latch bar adapted to be supported on said disk when said hook is in a position to receive said nozzle portion, a locking member pivotally connected to said latch bar and adapted to be movable by said disk when said nozzle portion moves said hook to locking position whereby said latch bar is permitted to move to a position to lock said disk to prevent release of said nozzle portion from said support, and means operated by said register to move said latch bar and pivoted member to inoperative position to permit the removal of said nozzle from said support when said register has been reset to a predetermined position.

11. In liquid dispensing apparatus, the combination of a meter the inlet side of which is adapted to be connected to means for supplying liquid to be measured thereto, a discharge line connected to the outlet side of said meter, said discharge line including a discharge hose and nozzle therefor, a register operated by the meter, the operation of the register being proportional to the amount of liquid dispensed, a reset shaft for said register, reset shaft operating means, a support for said nozzle, a housing disposed adjacent said support adapted to receive a portion of said nozzle, a locking hook disposed adjacent said housing adapted to be moved to over-lie the nozzle portion when received by said housing, a locking disk rotatable by said hook, said disk being provided with a notch, a vertically movable latch bar provided with a shoulder for supporting said latch bar on said disk when said hook is in a position to receive said nozzle portion, a pivoted latch member on said latch bar having a portion supported on said disk when said hook is in opened position and extending into said notch, movement of said hook by said nozzle portion being received in said housing causing said latch member to be moved to permit said latch bar to be received in said notch for preventing release of said nozzle portion from said hook, and means operated by said register to raise said latch bar and latch member to a position where said latch member supports said latch bar in inoperative position to permit movement of said hook to release said nozzle portion for removal of the nozzle from said support when said register has been reset to a predetermined position.

12. In liquid dispensing apparatus, the combination of a meter the inlet side of which is adapted to be connected to means for supplying liquid to be measured thereto, a discharge line connected to the outlet side of said meter, said discharge line including a discharge hose and nozzle therefor, a register operated by the meter, the operation of the register being proportional to the amount of liquid dispensed, a reset shaft for said register, reset shaft operating means, a support for said nozzle, a housing disposed adjacent said support adapted to receive a portion of said nozzle within a recess provided therein, a rotatable turnstile disposed adjacent said recess and having spokes so disposed that one of said spokes over-lies said recess and is adapted to be engaged by the nozzle portion when said nozzle is being moved to supported position on said support, an interlocking disk adapted to be rotated by said turnstile, said disk having locking shoulders and adjacent latching shoulders, a reciprocating bolt normally urged toward said disk, a member disposed on said bolt for supporting said bolt in inoperative position with relation to said disk but movable by movement of said disk to permit said bolt to be moved to engage said locking shoulders to prevent removal of said nozzle from said support, and means operated by said register to move said bolt to permit removal of the nozzle from said support when said register has been reset to a predetermined position.

13. In liquid dispensing apparatus, the combination of a meter the inlet side of which is adapted to be connected to means for supplying liquid to be measured thereto, a discharge line connected to the outlet side of said meter, said discharge line including a discharge hose and nozzle therefor, a register operated by the meter, the operation of the register being proportional to the amount of liquid dispensed, a reset shaft for said register, reset shaft operating means, a support for said nozzle, a housing disposed adjacent said support adapted to receive a portion of said nozzle within a recess provided therein, a rotatable member having a portion over-lying said recess and adapted to be engaged by said nozzle portion when being moved to supported position on said support, an interlocking disk movable by said rotatable member, a bolt adapted to interengage with said interlocking disk when said rotatable member is moved by application of the nozzle to said support and preventing removal of said nozzle from said housing, and means for rendering said bolt inoperative to permit said nozzle portion to move said rotatable member for releasing said nozzle from said housing when said register has been reset to a predetermined position.

14. In liquid dispensing apparatus, the combination of a meter the inlet side of which is adapted to be connected to means for supplying liquid to be measured thereto, a discharge line connected to the outlet side of said meter, said discharge line including a discharge hose and nozzle therefor, a register operated by the meter, the operation of the register being proportional to the amount of liquid dispensed, a reset shaft for said register, reset shaft operating means, a support for said nozzle, a housing disposed adjacent said support adapted to receive a portion of said nozzle within a recess provided therein, a turnstile member having a portion over-lying said recess and adapted to be engaged by said nozzle portion when being moved to supported position on said support, an interlocking disk adapted to be rotated by said turnstile member, said interlocking disk being provided with locking shoulders and adjacent latching shoulders, a reciprocally mounted bolt normally urged toward said locking shoulders, a member pivoted to said bolt and adapted to be supported on said latching shoulders when said bolt is inoperative, movement of said turnstile member by application of said nozzle to said support causing rotation of said interlocking disk to release said pivoted member from said latching shoulders whereby said bolt engages said locking shoulders to prevent removal of the nozzle portion from said recess, and means operated by said register to move said bolt to inoperative position to permit movement of said turnstile member whereby said nozzle portion may be removed from said recess when said register has been reset to a predetermined position.

15. In liquid dispensing apparatus, the combination of a meter the inlet side of which is adapted to be connected to means for supplying liquid to be measured thereto, a discharge line connected to the outlet side of said meter, said discharge line including a discharge hose and nozzle therefor, a register operated by the meter, the operation of the register being proportional to the amount of liquid dispensed, a reset shaft for said register, reset shaft operating means, a support for said nozzle, a housing disposed adjacent said support adapted to receive a portion of said nozzle within a recess provided therein, a turnstile member having a portion over-lying said recess and adapted to be engaged by said nozzle portion and being moved to supported position on said support, an interlocking disk adapted to be rotated by said turnstile member, said interlocking disk being provided with locking shoulders and adjacent latching shoulders, a reciprocally mounted bolt normally urged toward said locking shoulders, a member pivoted to said bolt and adapted to be supported on said latching shoulders when said bolt is inoperative, movement of said turnstile member by application of said nozzle to said support causing rotation of said interlocking disk to release said pivoted member from said latching shoulders whereby said bolt engages said locking shoulders to prevent removal of the nozzle portion from said recess, and means operated by said register to move said bolt out of engagement with said locking shoulders and to a position where said latch member can support said bolt on said locking disk to permit movement of the turnstile member whereby said nozzle portion may be released from said recess when said register has been reset to a predetermined position.

16. In liquid dispensing apparatus, the combination of a meter the inlet side of which is adapted to be connected to means for supplying liquid to be measured thereto, a discharge line connected to the outlet side of said meter, said discharge line including a discharge hose and nozzle therefor, a register operated by the meter, the operation of the register being proportional to the amount of liquid dispensed, a reset shaft for the register, reset shaft operating means, a support for said nozzle, securing means adjacent said support engageable with said nozzle for locking said nozzle on said support, said securing means including locking means having a portion thereof engageable with said nozzle, a latch member for said locking means movable to locked or unlocked positions whereby said locking means is rendered immovable or is conditioned to be movable, a member releasable to permit said locking member to move to locked position, and means controlled by said register for rendering said locking means inoperative when said register has been reset to a predetermined position.

FRED W. STURM.
BYRON J. PEPPER.